(12) United States Patent
Nomura et al.

(10) Patent No.: US 8,964,306 B2
(45) Date of Patent: Feb. 24, 2015

(54) LENS BARREL

(71) Applicant: Hoya Corporation, Tokyo (JP)

(72) Inventors: Hiroshi Nomura, Tokyo (JP); Mutsumi Koguchi, Tokyo (JP)

(73) Assignee: Hoya Corporation, Tokyo (JP)

( * ) Notice: Subject to any disclaimer, the term of this patent is extended or adjusted under 35 U.S.C. 154(b) by 61 days.

(21) Appl. No.: 13/968,579

(22) Filed: Aug. 16, 2013

(65) Prior Publication Data
US 2014/0063615 A1 Mar. 6, 2014

(30) Foreign Application Priority Data

Aug. 29, 2012 (JP) .................................. 2012-189269

(51) Int. Cl.
G02B 15/14 (2006.01)
G02B 7/04 (2006.01)
G02B 7/10 (2006.01)

(52) U.S. Cl.
CPC . *G02B 7/04* (2013.01); *G02B 7/102* (2013.01)
USPC ...................................................... 359/700

(58) Field of Classification Search
USPC ........................................................ 359/700
See application file for complete search history.

(56) References Cited

U.S. PATENT DOCUMENTS

| 6,819,502 | B2 | 11/2004 | Nomura et al. |
| 6,978,089 | B2 | 12/2005 | Nomura et al. |
| 6,987,930 | B2 | 1/2006 | Nomura |
| 7,885,020 | B2 * | 2/2011 | Sasaki ........................... 359/819 |
| 7,953,317 | B2 | 5/2011 | Sasaki |
| 2013/0033760 | A1 | 2/2013 | Nomura |

FOREIGN PATENT DOCUMENTS

| JP | 2004-258646 | 9/2004 |
| JP | 2009-222874 | 10/2009 |
| JP | 2009-222875 | 10/2009 |

* cited by examiner

*Primary Examiner* — James Jones
(74) *Attorney, Agent, or Firm* — Greenblum & Bernstein, P.L.C.

(57) ABSTRACT

A lens barrel includes an outer barrel including a first cam follower, an internal movable member including a second cam follower, a cam ring, a first cam groove formed on a surface of the cam ring and engaged with the first cam follower, and a second cam groove formed on the surface of the cam ring and is open at a front end of the cam ring. When the outer barrel is positioned in front of a predetermined position, the second cam groove determines a position of the internal movable member in the outer barrel via a limit portion while the second cam groove is not engaged with the second cam follower, and when the outer barrel moves rearward beyond the predetermined position, the second cam groove engages with the second cam follower and moves the internal movable member rearward.

7 Claims, 9 Drawing Sheets

LENS BARREL

BACKGROUND OF THE INVENTION

1. Field of the Invention

The present invention relates to a lens barrel, in particular to a lens barrel in which movable members move in an optical axis direction by rotation of a cam ring incorporated in the lens barrel.

2. Description of the Related Art

A lens barrel in which the relative position between a lens group closest to the object side (hereinafter referred to as a front lens group) and a lens barrier in an optical axis direction changes is known in the art as a type of lens barrel which shields an opening thereof in front of an optical system (photographing optical system/imaging optical system) by the lens barrier (generally composed of one or more barrier blades) when moving from a ready-to-photograph state to a lens barrel accommodated state (lens barrel retracted state). When the lens barrel is in the lens barrel accommodated state, in which the lens barrier is shut, the front lens group is retracted relative to the lens barrier to be prevented from interfering with the lens barrier. When the lens barrel is in a ready-to-photograph state, the front lens group is extended out forward relative to the lens barrier in a manner to prevent vignetting of incident light which may be caused by the inner edge of the opening of the lens barrier.

In the case of controlling differentially driven members such as the front lens group and the lens barrier using cam grooves formed on a cam ring, two types of cam grooves having different cam contours are formed on a periphery of the cam ring, which tends to add constraints to miniaturization of the cam ring, mainly in the optical axis direction. Specifically, if two or more types of cam grooves which are formed on the same peripheral surface (inner or outer periphery) of a cam ring have a nonlinear cam track as disclosed in Japanese Unexamined Patent Publication No. 2004-258646, the cam grooves are easily interfere with each other; additionally, it has been difficult to position the two or more types of cam grooves, which are formed on the same periphery of the cam ring, close to one another as possible so as to have a minimum distance therebetween. To overcome this problem, in Japanese Unexamined Patent Publication No. 2009-222875, the two types of cam grooves formed on a peripheral surface of a cam ring are formed as linear lead grooves, and a nonlinear moving path is given to a movable member by a complementary cam mechanism provided separately from the aforementioned linear lead grooves. The formation of the plural types of grooves as lead grooves improves the space utilization on the periphery of the cam ring and makes it possible to achieve miniaturization of the cam ring.

In lens barrels of the related art, two types of cam grooves like those described above are each formed on a cam ring as a cam groove having a full cam track that covers the entire moving range of an associated movable member, the movement of which is controlled by the associated one of the two types of cam grooves. Therefore, an improvement in space utilization by formation of each cam groove as a lead groove can be achieved like in the case of the above-mentioned Japanese Unexamined Patent Publication No. 2009-222875; however, since two types of full-shape cam grooves (including lead grooves) need to be formed on the same peripheral surface (outer or inner periphery) of the cam ring, there still have been constraints in space utilization, limiting the miniaturization of the cam ring.

SUMMARY OF THE INVENTION

The present invention has been devised in view of the above-mentioned drawbacks and provides a lens barrel having a cam ring for controlling the positions of two movable members (e.g., a front lens group and a lens barrier) which vary the distance therebetween while moving in an optical axis direction, wherein the cam ring can be further miniaturized.

According to an aspect of the present invention, a lens barrel is provided, including an outer barrel which is supported to be movable linearly in an optical axis direction of an imaging optical system, the outer barrel including a first cam follower; an internal movable member which is supported to be movable linearly in the optical axis direction in the outer barrel, the internal movable member including a second cam follower; a biaser which biases the internal movable member forward in the optical axis direction; a limit portion which determines a limit of forward movement of the internal movable member in the outer barrel; a rotational cam ring; a first cam groove which is formed on a peripheral surface of the cam ring and engaged with the first cam follower to control movement of the outer barrel in the optical axis direction in accordance with a rotation of the cam ring; and a second cam groove which is formed on the peripheral surface of the cam ring, on which the first cam groove is formed, so as to be open at a front end of the cam ring. When the outer barrel is positioned in front of a predetermined position in the optical axis direction, the second cam follower is disengaged forwardly from the second cam groove so that the internal movable member is positioned at a forward-movement limit in the outer barrel that is determined by the limit portion. When the outer barrel moves rearward beyond the predetermined position in the optical axis direction in accordance with rotation of the cam ring, the second cam groove is engaged with the second cam follower and moves the internal movable member rearward in the optical axis direction in the outer barrel against a biasing force of the biaser.

It is desirable for the second cam groove to decrease in width with respect to a rearward direction in the optical axis direction. Accordingly, the second cam follower, which is provided on the internal movable member, can be easily made to be engaged with the second cam groove of the cam ring.

It is desirable for the internal movable member to support a frontmost lens group of the imaging optical system, wherein the outer barrel supports a lens barrier which closes an opening in front of the frontmost lens group when the imaging optical system is in an accommodated position, in which no pictures are taken through the imaging optical system. When the internal movable member is positioned at the forward-movement limit thereof in the outer barrel, the lens barrier opens to form a lens barrier opening while the frontmost lens group at least partly enters through the lens barrier opening. When the internal movable member is moved rearward in the optical axis direction in the outer barrel via the second cam groove engaged with the second cam follower, the frontmost lens group moves rearward to be positioned behind the lens barrier opening, and thereafter, the lens barrier is closed.

It is desirable for a portion of the cam ring on which the second cam groove is formed as a thin-wall portion to be smaller in radial wall thickness than a portion of the cam ring on which the first cam groove is formed, wherein the internal movable member includes an overlapping portion which overlaps the thin-wall portion when the internal movable member closely approaches the cam ring in the optical axis direction, and the second cam follower projects from the overlapping portion.

With this structure, a portion in which the second cam follower on the internal movable member is engaged with the second cam groove is arranged in a space-efficient manner, which makes it possible to prevent the lens barrel from being enlarged.

It is desirable for the first cam groove to be open at a rear end of the cam ring, and for the first cam follower to be positioned at the opening of the first cam groove at the rear end of the cam ring when the second cam follower is engaged with the second cam groove so that a position of the second cam follower in the optical axis direction is controlled by the second cam groove.

This structure makes it possible to omit from the cam ring a wall thickness for closing the rear end of the first cam groove, thus making it possible to achieve a further reduction in size of the cam ring in the optical axis direction.

It is desirable for the internal movable member to be an annular internal movable member that is concentric with the outer barrel. The limit portion includes a plurality of projecting portions which are projected from an outer periphery of the annular internal movable member at different circumferential positions thereon; and a plurality of opposed contact portions which are formed on an inner periphery of the outer barrel at different circumferential positions thereon to be respectively positioned in front of the plurality of projecting portions in the optical axis direction so as to be opposed thereto. The biaser includes a plurality of compression springs which are installed at different circumferential positions between a front support wall and a rear support wall which are formed on the outer periphery of the annular internal movable member and the inner periphery of the outer barrel, respectively, to be opposed to each other in the optical axis direction.

It is desirable for the lens barrel to be a retractable type lens barrel that advances forwardly when the lens barrel is in use and retracts rearwardly when the lens barrel is not in use.

According to the present invention, the second cam groove can be shortened compared with the overall moving path of the internal movable member, which makes it possible to achieve miniaturization of the cam ring, specifically in the optical axis direction, due to the internal movable member being supported to be movable in the optical axis direction in the outer barrel, movement of which is controlled by the first cam groove of the cam ring; due to the limit of forward movement of the internal movable member in the outer barrel being determined by contact of the limit portion with the internal movable member using the biasing force of the biaser; and due to rearward movement of the internal movable member in the outer barrel being performed via the second cam groove on the cam ring.

The present disclosure relates to subject matter contained in Japanese Patent Application No. 2012-189269 (filed on Aug. 29, 2012) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
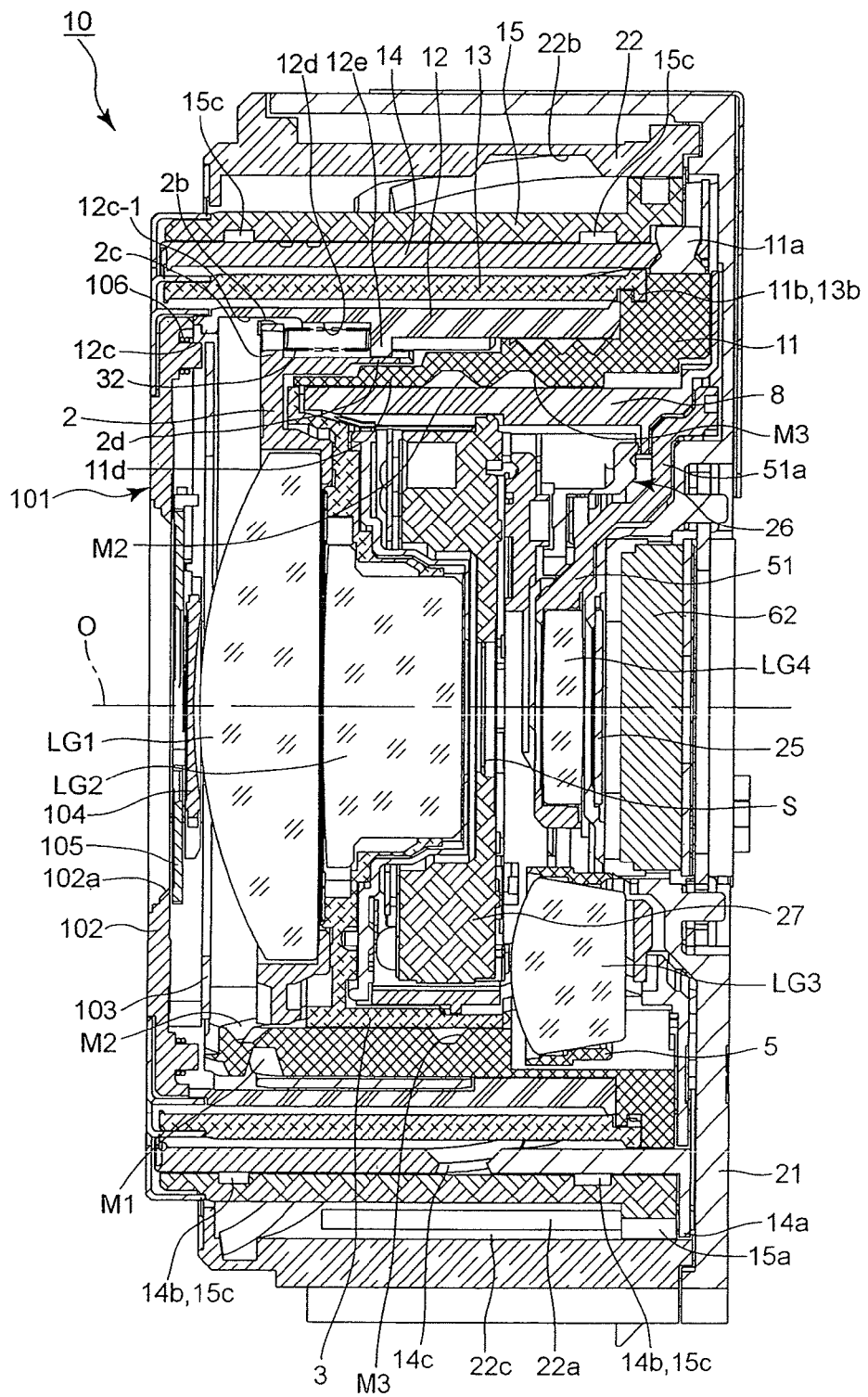
FIG. 1 is a sectional side elevational view of an embodiment of a zoom lens barrel according to the present invention, showing the zoom lens barrel in a lens barrel accommodated state (fully retracted state)

The overall structure of a retractable type zoom lens barrel 10 will be hereinafter discussed with reference mainly to FIG. 1 through 3. The zoom lens barrel 10 is provided with an imaging optical system including a first lens group (frontmost lens group) LG1, a second lens group LG2, a shutter unit S, a third lens group LG3, a fourth lens group LG4, an optical filter 25 and an image sensor (image pickup device) 62, in that order from the object side, when the zoom lens barrel 10 is in a ready-to-photograph state (extended state) shown in FIG. 2. The imaging optical system is a zoom (variable focal length) optical system in which a zooming operation is performed by moving the first lens group, the second lens group LG2 and the third lens group LG3 along a photographing optical axis O according to predetermined moving paths. In addition, a focusing operation is performed by moving the fourth lens group LG4 along the photographing optical axis O. Note that in explanations hereinafter, the optical axis direction refers to a direction along, or parallel to, the photographing optical axis O of the imaging optical system; the "forward" direction refers to a direction along the optical axis toward the object side (toward the left side with respect to FIGS. 1 and 2), and the "rearward" direction refers to a direction along the optical axis toward the image side (toward the right side with respect to FIGS. 1 and 2).

The zoom lens barrel 10 is provided with a housing 22 in the shape of a cylinder as a stationary member. The zoom lens barrel 10 is provided with an image sensor holder 21 which is fixed to the rear of the housing 22. The optical filter 25 and the image sensor 62 are supported by a front surface of the image sensor holder 21.

The zoom lens barrel 10 is provided with a fourth lens group frame 51 which holds the fourth lens group LG4. The fourth lens group frame 51 is provided on radially opposite sides thereof with a pair of guide arms 51a and 51b which extend radially outward. The zoom lens barrel 10 is provided with a guide shaft (not shown) which is fixed to the inside of the housing 22 to extend in the optical axis direction, and this guide shaft is slidably fitted into a guide hole (through-hole) formed through the outer end of the guide arm 51a. The outer end of the other guide arm 51b is slidably engaged in an elongated groove 22a which is formed on an inner peripheral surface of the housing 22 to elongate in the optical axis direction. With this structure, the fourth lens group frame 51 is supported by the housing 22 to be movable linearly in the optical axis direction relative to the housing 22. The fourth lens group frame 51 is driven by an AF motor (not shown) to move forward and rearward in the optical axis direction.

The zoom lens barrel 10 is provided inside the housing 22 with a third barrel 15. The third barrel 15 is provided on an outer peripheral surface thereof with a circumferential gear 15a which is in mesh with a zoom gear (not shown) which is supported by the housing 22 therein. The zoom gear is driven to rotate by a zoom motor 150 (see FIG. 3) to transmit the rotational force of the zoom gear to the third barrel 15 via the circumferential gear 15a. Helicoid threads 15b are formed on portions of the outer peripheral surface of the third barrel 15 in the same range (with respect to the optical axis direction) as the circumferential gear 15a in the optical axis direction; these helicoid threads 15b are engaged with an inner helicoid 22b which is formed on an inner peripheral surface of the housing 22. Rotating the zoom gear by the zoom motor 150 from the accommodated (fully-retracted) state shown in FIG. 1 causes the third barrel 15 to move forward in the optical axis direction while rotating relative to the housing 22 and being guided by the inner helicoid 22b.

The zoom lens barrel 10 is provided with a linear guide ring 14 which is positioned inside the third barrel 15 and supported thereby. The housing 22 is provided on an inner peripheral surface thereof with a plurality of linear grooves 22c which extend in the optical axis direction, and the linear guide ring 14 is guided linearly in the optical axis direction relative to the housing 22 via the engagement of a plurality of linear guide projections 14a which project radially outward from the linear guide ring 14 with the linear grooves 22c. The linear guide ring 14 moves with the third barrel 15 in the optical axis direction while allowing the third barrel 15 to rotate relative to the linear guide ring 14 due to the engagement of a plurality of front rotation guide projections 14b and a plurality of rear rotation guide projections 14b, which are formed on an outer peripheral surface of the linear guide ring 14, with two (front and rear) circumferential grooves 15c, respectively, which are formed on an inner peripheral surface of the third barrel 15 and are centered about the photographing optical axis O.

The linear guide ring 14 is provided with a plurality of protrusion-guiding cam grooves (cam slots/through-grooves) 14c which are formed through inner and outer peripheral surfaces of the linear guide ring 14. The protrusion-guiding cam grooves 14c are formed to extend obliquely with respect to the photographing optical axis O. The zoom lens barrel 10 is provided radially inside the linear guide ring 14 with a cam ring (rotational ring) 11, which is rotatable about the photographing optical axis O. A plurality of outer radial projections 11a which are fixed to an outer peripheral surface of the cam ring 11 at different circumferential positions thereon to project radially outwards are slidably engaged in the protrusion-guiding cam grooves 14c, respectively. The outer radial projections 11a extend radially outwards through the protrusion-guiding cam grooves 14c to be engaged in a plurality of rotation transfer grooves 15d which are formed on an inner peripheral surface of the third barrel 15 to extend in the optical axis direction. Due to this engagement of the outer radial projections 11a with the rotation transfer grooves 15d, the cam ring 11 is rotated with the third barrel 15. The cam ring 11 moves forward and rearward in the optical axis direction relative to the third barrel 15 and the linear guide ring 14 while rotating relative to the housing 11 while being guided by the protrusion-guiding cam grooves 14c.

The linear guide ring 14 is provided on an inner peripheral surface thereof with a plurality of linear guide grooves 14d and a plurality of linear guide grooves 14e which are formed at different circumferential positions to extend in the optical axis direction. The zoom lens barrel 10 is provided inside the cam ring 11 with a third-lens-group support ring 8. The third-lens-group support ring 8 is provided with a plurality of linear guide projections 8a which are slidably engaged in the linear guide grooves 14d of the linear guide ring 14 so that the third-lens-group support ring 8 is guided linearly in the optical axis direction via the linear guide ring 14. The zoom lens barrel 10 is provided inside the linear guide ring 14 with a second barrel 13. The second barrel 13 is provided with a plurality of linear guide projections 13a which are slidably engaged in the linear guide grooves 14e of the linear guide ring 14 so that the second barrel 13 is also guided linearly in the optical axis direction via the linear guide ring 14. The second barrel 13 is provided on an inner peripheral surface thereof with a plurality of rotation guide projections 13b, and the cam ring 11 is provided on an outer peripheral surface thereof with a circumferential groove 11b in which the rotation guide projections 13b are slidably engaged. Due to the engagement of the rotation guide projections 13b with the circumferential groove 11b, the second barrel 13 moves with the cam ring 11 in the optical axis direction while allowing the cam ring 11 to rotate relative to the second barrel 13.

The zoom lens barrel 10 is provided inside the third-lens-group support ring 8 with an anti-shake unit 26, and the third lens group LG3 is positioned inside the third-lens-group support ring 8 and supported thereby via the anti-shake unit 26. The anti-shake unit 26 supports the third lens group LG3 in a manner to allow the third lens group LG3 to move along a plane substantially orthogonal to the photographing optical axis O. Deviations (image shake) of an object image focused on an image plane can be reduced by driving the third lens group LG3 in directions orthogonal to the photographing optical axis O by the anti-shake unit 26 in accordance with the direction and magnitude of vibrations applied to the zoom lens barrel 10. The zoom lens barrel 10 is provided inside the third-lens-group support ring 8 with a shutter unit 27 which incorporates the shutter S. The shutter unit 27 is fixed to the front of the anti-shake unit 26.

Figure 2:
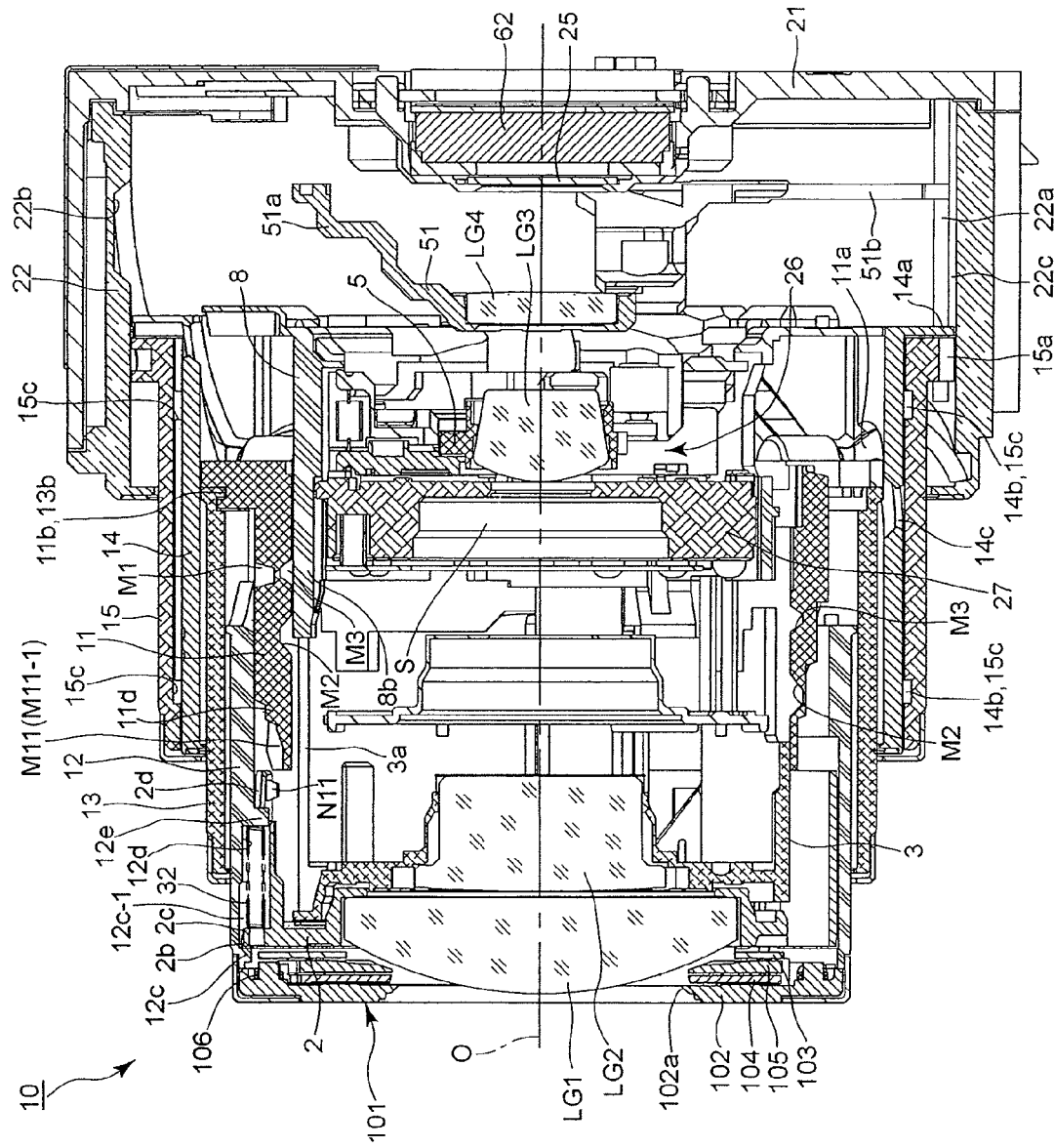
FIG. 2 is a sectional side elevational view of the zoom lens barrel in an extended state (ready-to-photograph state)
Figure 3:
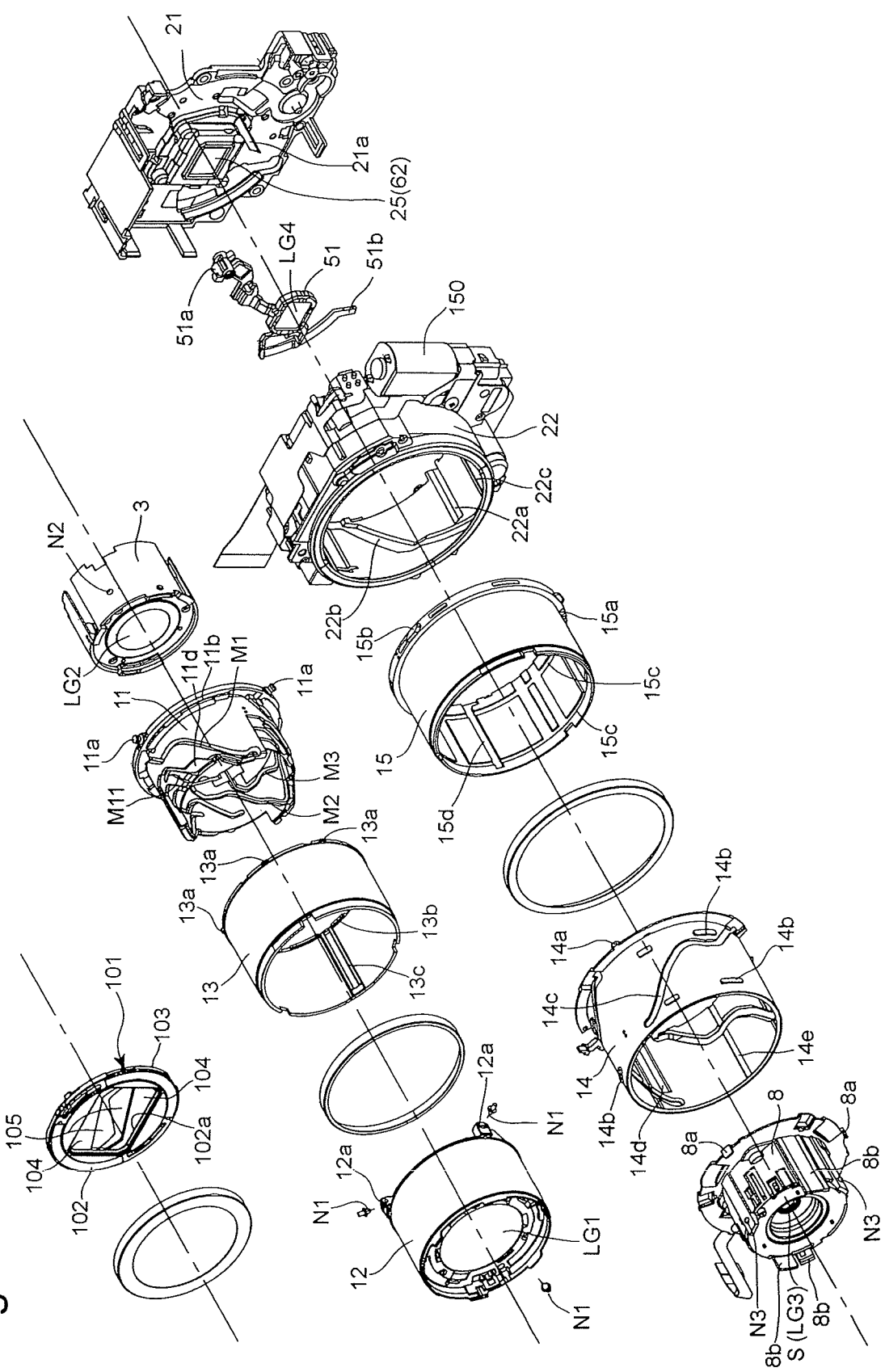
FIG. 3 is an exploded perspective view of the zoom lens barrel.

Although not shown in detail in the drawings due to not being directly related to the present invention, the third lens group frame 5, which supports the third lens group LG3, is positioned in the anti-shake unit 26 and pivoted thereto about a rotational shaft parallel to the photographing optical axis O to be swingable (rotatable) about this rotational shaft between the insertion position shown in FIG. 2, at which the third lens group LG3 is positioned on the photographing optical axis O, and the removed position shown in FIG. 1, at which the third lens group LG3 is removed from the photographing optical axis O. The third lens group frame 5 is continuously biased toward the insertion position and therefore is held in the insertion position when no external force is exerted on the third lens group frame 5. Rearward movement of the third lens group support frame 8 in the optical axis direction from a predetermined position causes an insertion/removal pressing projection 21a, which is projected forward from the image sensor holder 21, to come into contact with and press the third lens group frame 5. Thereupon, a component force which makes the third lens group frame 5 rotate to the removed position is produced from the retracting force of the third-lens-group support ring 8, thus causing the third lens group frame 5 to rotate to the removed position.

The third-lens-group support ring 8 is provided with a plurality of linear guide keys 8b which extends forward in the optical axis direction. The zoom lens barrel 10 is provided inside the third-lens-group support ring 8 with a second-lens-group support ring 3 having a plurality of linear grooves on an inner peripheral surface thereof, and the linear guide keys 8b of the third-lens-group support ring 8 are slidably engaged in the linear guide grooves of the second-lens-group support ring 3. Due to the engagement between the linear guide keys 8b of the third-lens-group support ring 8 and the linear guide grooves of the second-lens-group support ring 3, the second lens group support ring 3 is guided linearly in the optical axis direction via the third-lens-group support ring 8. The second lens group LG2 is fixedly supported by the second-lens-group support ring 3 therein.

The second barrel 13 is provided on an inner peripheral surface thereof with a plurality of linear guide grooves 13c which extend in the optical axis direction. The zoom lens barrel 10 is provided inside the second barrel 13 with a first barrel (outer barrel) 12. The first barrel 12 is provided with a plurality of linear guide projections 12a which are slidably engaged in the linear guide grooves 13c of the second barrel 13 so that the first barrel 12 is guided linearly in the optical axis direction via the second barrel 13. The first lens group LG1 is positioned inside the first barrel 12 and supported thereby via the first-lens-group support ring (internal movable member) 2. The relationship between the first barrel 12 and the first-lens-group support ring 2 will be discussed later.

The cam ring 11 is provided on an inner peripheral surface thereof with a plurality of second-lens-group control cam grooves M2, and the second-lens-group support ring 3 is provided on an outer peripheral surface thereof with a plurality of cam followers N2 which are engaged in the second-lens-group control cam grooves M2. Likewise, the cam ring 11 is provided on an inner peripheral surface thereof with a plurality of third-lens-group control cam grooves M3, and the third-lens-group support ring 8 is provided on an outer peripheral surface thereof with a plurality of cam followers N3 which are engaged in the third-lens-group control cam grooves M3. Since each of the second-lens-group support ring 3 and the third-lens-group support ring 8 is guided linearly in the optical axis direction, a rotation of the cam ring 11 causes the second-lens-group support ring 3 and the third-lens-group support ring 8 to move in the optical axis direction in a predetermined moving manner in accordance with the contours of the second-lens-group control cam grooves M2 and the third-lens-group control cam grooves M3 to control the positions of the second lens group LG2 and the third lens group LG3, respectively.

The first barrel 12 is provided with a plurality of cam followers (first cam followers) N1 which project radially inwards, and the cam ring 11 is provided on an outer peripheral surface thereof with a plurality of first-lens-group control cam grooves (first cam grooves) M1 in which the cam followers N1 are slidably engaged. Since the first barrel 12 is guided linearly in the optical axis direction, a rotation of the cam ring 11 causes the first barrel 12 to move in the optical axis direction in a predetermined moving manner in accordance with the contours of the first-lens-group control cam grooves M1 to control the position of the first lens group LG1.

The zoom lens barrel 10 is provided at the front end of the first barrel 12 with a lens barrier mechanism 101 (see FIG. 6) for shielding the front of the first lens group LG1 when the zoom lens barrel 10 is in the lens barrel accommodated state. The lens barrier mechanism 101 is provided with a barrier support ring 102 having an opening 102a at the center thereof, a barrier drive ring 103 which is positioned behind the barrier support ring 102, a pair of barrier blades 104 and a pair of barrier blades 105. The barrier blades 104 and the barrier blades 105 are positioned between the barrier support ring 102 and the barrier drive ring 103. Each barrier blade 104 is pivoted about a pivot, the axis of which extends in the optical axis direction, and each barrier blade 105 is pivoted about another pivot, the axis of which also extends in the optical axis direction. In accordance with forward and reverse rotations of the barrier drive ring 103, the barrier blades 104 and the barrier blades 105 perform an opening/shutting operation to open/shut the opening 102a of the barrier support ring 102 while moving in association with each other; the barrier blades 104 and the barrier blades 105 are closed to shut the opening 102a when the zoom lens barrel 10 is in the lens barrel accommodated state shown in FIG. 1 and open to fully open the opening 102a when the zoom lens barrel 10 is in the ready-to-photograph state shown in FIG. 2.

Figure 6:
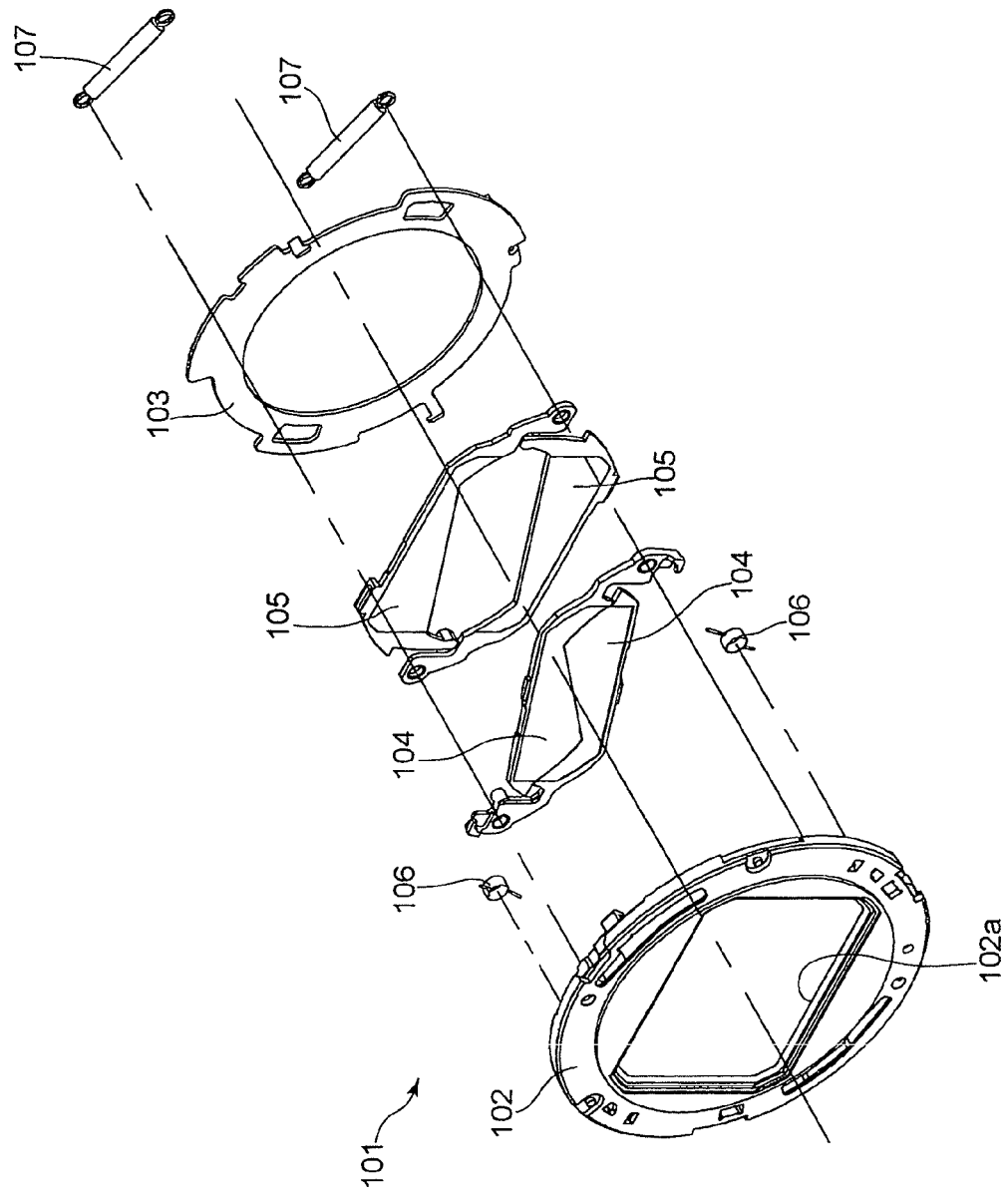
FIG. 6 is an exploded perspective view of a lens barrier mechanism that is supported by the first cylinder.

More specifically, as shown in FIG. 6, the lens barrier mechanism 101 is further provided with a pair of torsion springs 106 which bias the barrier blades 104 and the barrier blades 105 in directions to close the opening 102a, and a pair of extension springs 107 which bias the barrier drive ring 103 in a direction to open the barrier blades 104 and the barrier blades 105. The pair of extension springs 107 is set greater in biasing force than the pair of torsion springs 106. In the ready-to-photograph state shown in FIG. 2, the barrier drive ring 103 positioned at a mechanical rotation limit thereof by the extension springs 107 presses the barrier blades 104 and the barrier blades 105 to move the lens barrier mechanism 101 to a barrier opened state as shown in FIG. 2. When the zoom lens barrel 10 moves from the ready-to-photograph state shown in FIG. 2 to the lens barrel accommodated state shown in FIG. 1, a press portion 11c (see FIGS. 4 and 7) formed at a front end of the cam ring 11 presses and rotates the barrier drive ring 103 in the rotational direction against the biasing force of the extension springs 107, and this rotation of the barrier drive ring 103 causes the barrier blades 104 and the barrier blades 105 which are released from being pressed by the barrier drive ring 103 to be closed by the biasing force of the torsion springs 106.

In the above described zoom lens barrel 10, various engaging portions designed as linear guide portions or rotation transmission portions between members are provided at different circumferential positions to achieve stable engaging and supporting capabilities. For instance, the number of the first-lens-group control cam grooves M1, the number of the second-lens-group control cam grooves M2 and the number of the third-lens-group control cam grooves M3 are all three, formed at substantially regular intervals (equi-angular intervals) in the circumferential direction about the photographing optical axis O. Likewise, the cam followers N1, the cam followers N2 and the cam followers N3 are provided at substantially regular intervals (equi-angular intervals) in the circumferential direction about the photographing optical axis O. Although not described herein individually, an optimum number and arrangement of engaging portions other than the cam grooves and the cam followers are predetermined and provided to prevent tilting from occurring to thereby achieve stable support and sliding movement.

Figure 5:
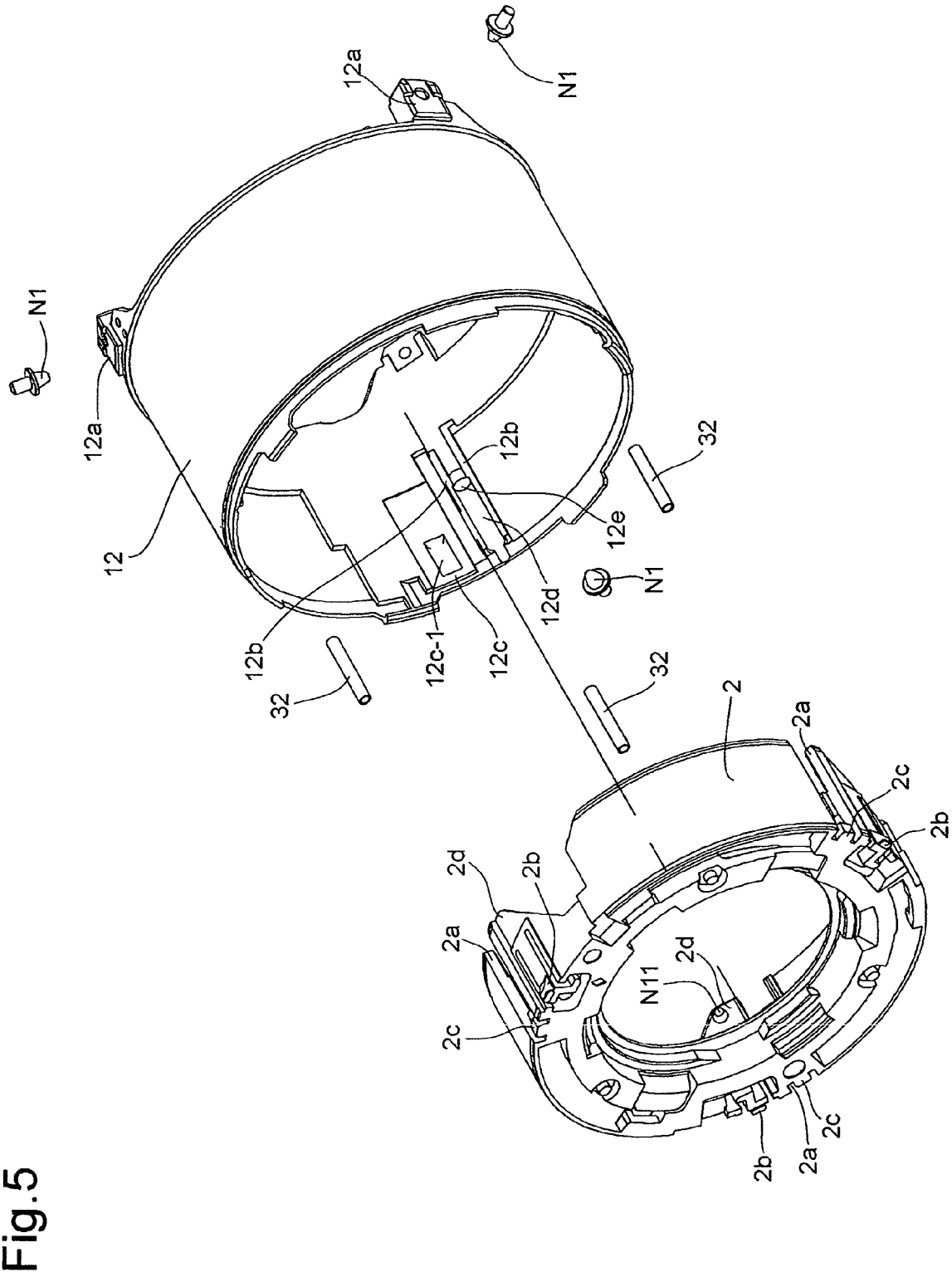
FIG. 5 is an exploded perspective view of a first-lens-group support ring that supports the first lens group, a first cylinder and associated elements.

The support structure for the first lens group LG1 will be discussed in detail hereinafter. As shown in FIG. 5, the first barrel 12 is provided on an inner peripheral surface thereof with three guide keys 12b which extend rearward in the optical axis direction from portions of the inner peripheral surface in the vicinity of the front end of the first barrel 12. The first-lens-group support ring 2 is provided on an outer peripheral surface thereof with three guide grooves 2a which extend in the optical axis direction. The guide keys 12b are slidably engaged in the guide grooves 2a, respectively. The first-lens-group support ring 2 is supported by the first barrel 12 therein to be movable linearly in the optical axis direction and to be prevented from rotating relative to the first barrel 1 by the slidable engagement between the lateral sides of each guide key 12b and the laterally opposed side surfaces of the associated guide groove 2*a*. The first-lens-group support ring 2 is provided on an outer peripheral surface thereof with three front limit projections (limit portions/projecting portions) 2*b* which are formed at positions adjacent to the guide grooves 2*a*, respectively. The front limit projections 2*b* project forward in the optical axis direction from the front end surface of the main body of the first-lens-group support ring 2, and the limit of forward movement of the first-lens-group support ring 2 relative to the first barrel 12 is determined by contact of the front end surfaces of the front limit projections 2*b* with three limit walls (limit portions/opposed contact portions) 12*c* which are formed on an inner peripheral surface of the first barrel 12, respectively. The limit walls 12*c* are walls which close the front ends of three recessed portions 12*c*-1, formed on an inner peripheral surface of the first barrel 12, and the front limit projections 2*b* enter the recessed portions 12*c*-1 to be opposed to the limit walls 12*c* in the optical axis direction, respectively. Note that the structure which determines the limit of forward movement of the first-lens-group support ring 2 relative to the first barrel 12 is not limited solely to this particular structure. For instance, the limit of forward movement of the first-lens-group support ring 2 can be determined even if the zoom lens barrel 10 is structured such that the front limit projections 2*b* do not project forward in the optical axis direction from the front end surface of the main body of the first-lens-group support ring 2 or that portions of the first-lens-group support ring 2 other than the front limit projections 2*b* come into contact with the first barrel 12.

The first barrel 12 is provided on an inner peripheral surface thereof with three spring mount recesses 12*d*, into which three biasing springs (biasers/compression springs) 32 are inserted, respectively. The spring mount recesses 12*d* are formed at centers of the guide keys 12*b* in the widthwise direction thereof, respectively. The front ends of the spring mount recesses 12*d* are formed as open ends, and the rear ends of the same are closed by spring support walls 12*e*, respectively, which are formed on the inner periphery of the first barrel 12. Each biasing spring 32 is a compression coil spring and installed so that the longitudinal axis thereof extends in the optical axis direction. The rear ends of the biasing springs are in contact with the spring support walls 12*e*, respectively. The front ends of the biasing springs 32 are in contact with spring support walls 2*c*, respectively, which are formed on the outer periphery of the first-lens-group support ring 2. The spring support walls 2*c* are formed as radial upright walls which close the front ends of the guide grooves 2*a*, respectively. The distance between the spring support walls 2*c* and the spring support walls 12*e* that are positioned behind the spring support walls 2*c* varies in accordance with variations of the position of the first-lens-group support ring 2 relative to the first barrel 12 in the optical axis direction and becomes maximum when the first-lens-group support ring 2 is at the limit of forward movement thereof, where the front limit projections 2*b* come in contact with the limit walls 12*c*, respectively (i.e., the contacting of the front limit projections 2*b* with the limit walls 12*c* determines the forward-movement limit of the first-lens-group support ring 2 inside the first barrel 12). The length of each biasing spring 32 in a free state is set greater than the maximum distance between the spring support walls 2*c* and the spring support walls 12*e* that are spaced most from each other. Accordingly, the biasing springs 32 which are installed between the spring support walls 2*c* and the spring support walls 12*e* (in the spring mount recesses 12*d*) are in a compressed state at all times (from a free state), thus biasing the first-lens-group support ring 2 forward in the first barrel 12 at all times by the resiliency of the biasing springs 32. Hence, the first-lens-group support ring 2 is held at the limit of forward movement thereof, at which the front limit projections 2*b* of the first-lens-group support ring 2 are in contact with the limit walls 12*c* of the first barrel 12, respectively, by the resiliency (biasing force) of the biasing springs 32. The guide grooves 2*a* and the guide keys 12*b*, the front limit projections 2*b* and the limit walls 12*c*, the spring support walls 2*c* and the spring mount recesses 12*d* (the spring support walls 12*e*) and the biasing springs 32 are all three in number and arranged at substantially regular intervals in the circumferential direction about the photographing optical axis O.

As described above, the position of the first barrel 12 is controlled by the first-lens-group control cam grooves M1 of the cam ring 11. Reference marks "R1", "W1" and "T1" shown in FIG. 7 designate the positions of each cam follower N1 in the associated first-lens-group control cam groove M1 when the zoom lens barrel 10 is in the lens barrel accommodated state (shown FIG. 1), the wide-angle extremity in the ready-to-photograph state (shown in FIG. 2) and the telephoto extremity in the ready-to-photograph state, respectively. The positions R1, W1 and T1 will be hereinafter referred to as a retracted position R1, a wide-angle extremity position W1 and a telephoto extremity position T1, respectively. The section of each first-lens-group control cam groove M1 which extends from the wide-angle extremity position W1 to the telephoto extremity position T1 serves as a zooming range used to perform a zooming operation during a photographing operation. As can be understood from the shape of each first-lens-group control cam groove M1 shown in FIG. 7, the first barrel 12 is positioned at the rearmost position thereof relative to the cam ring 11 when the zoom lens barrel 10 is in the lens barrel accommodated state, and the first barrel 12 is extended forward in the optical axis direction as the zoom lens barrel 10 moves toward the telephoto extremity from the wide-angle extremity. In each first-lens-group control cam groove M1, a rear end section thereof in the vicinity of the retracted position R1 of the associated cam follower N1 is open to the rear end of the cam ring 11.

Figure 4:
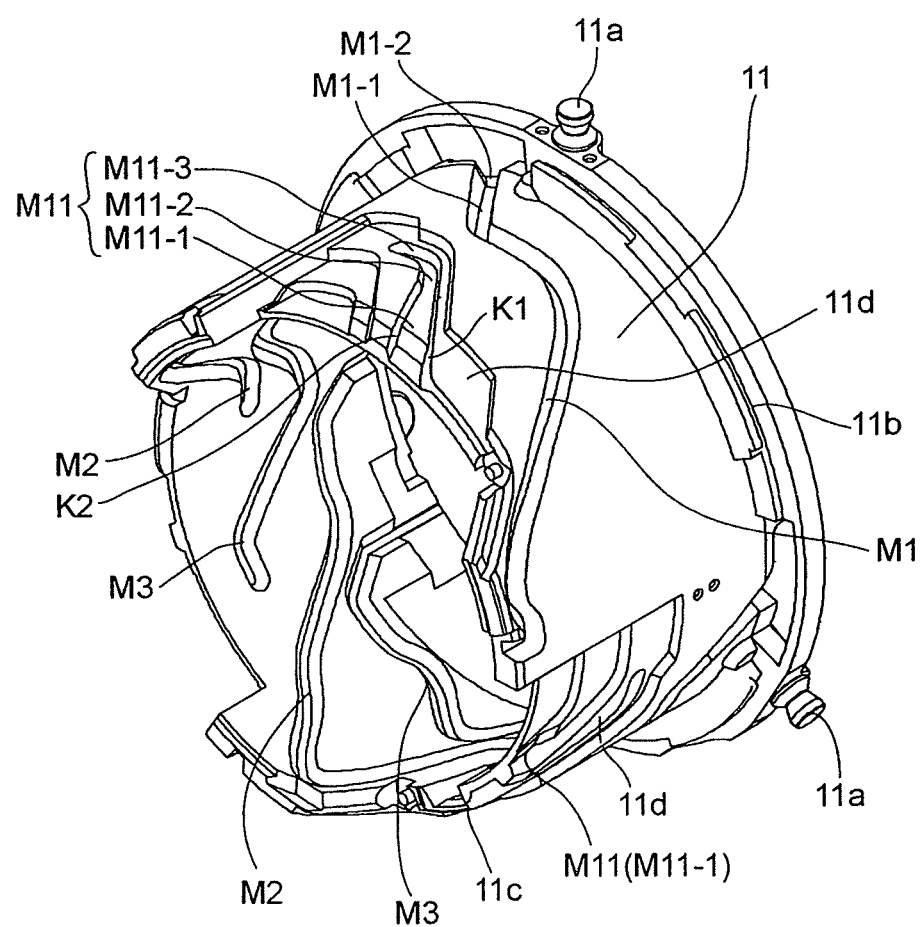
FIG. 4 is a perspective view of a cam ring shown in FIGS. 1 through 3.
Figure 7:
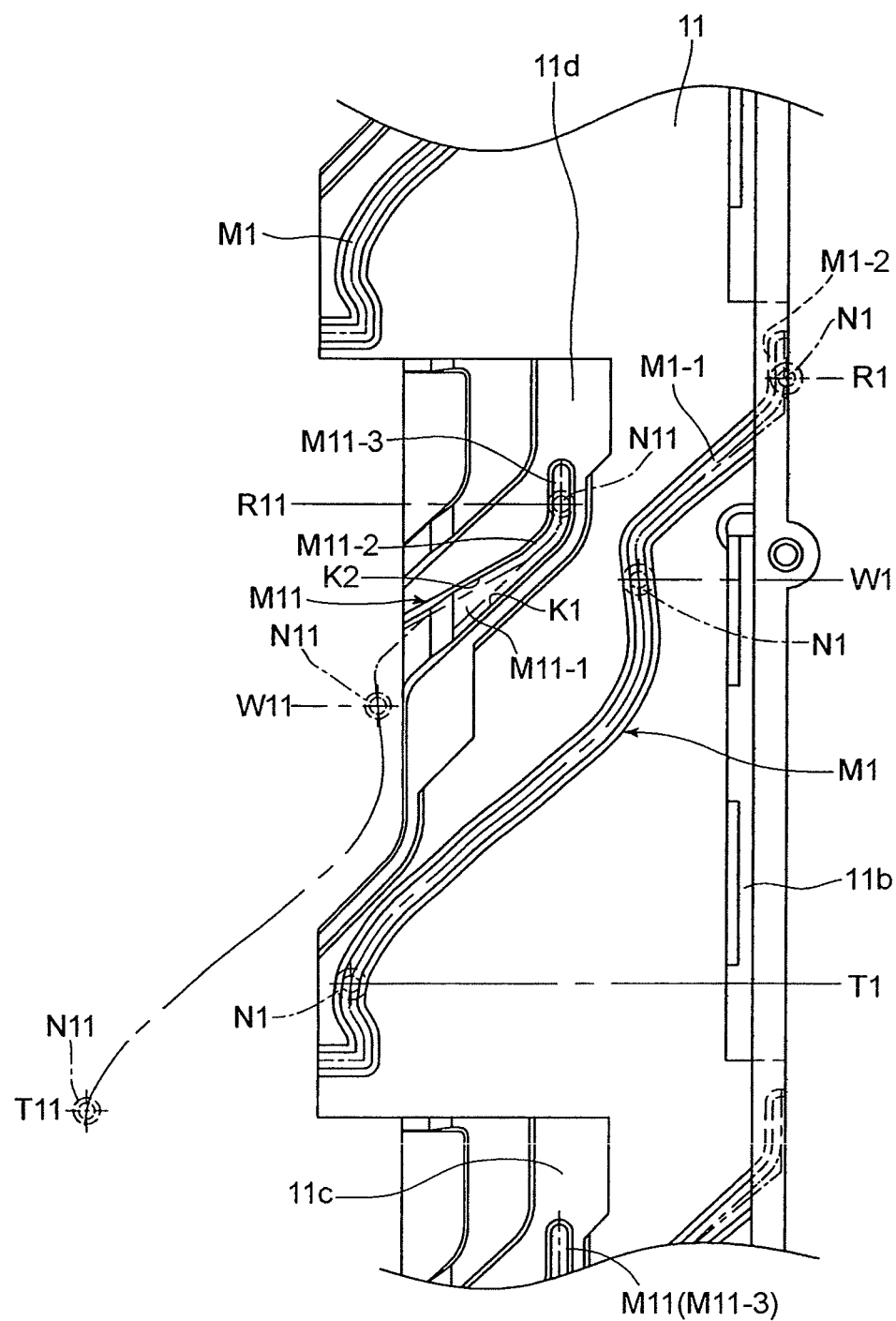
FIG. 7 is a developed view of a portion of the outer peripheral surface of the cam ring.

As shown in FIGS. 4 and 7, the cam ring 11 is provided on an outer peripheral surface thereof with three first-lens-group accommodating cam grooves (second cam grooves) M11 that are formed independently of the first-lens-group control cam grooves M1. The cam ring 11 is provided, on an outer peripheral surface thereof at substantially regular intervals in the circumferential direction of the cam ring 11, with three thin-walled portions 11*d* which are recessed radially inwards from the outer peripheral surface of the portion of the cam ring 11 on which the first-lens-group control cam grooves M1 are formed. The first-lens-group accommodating cam grooves M11 are formed on the thin-walled portions 11*d*, respectively. As shown in FIGS. 1, 2, 5, 8 and 9, the first-lens-group support ring 2 is provided, at the rear end thereof at positions corresponding to the thin-walled portions 11*d*, with three support members (overlapping portions) 2*d* from which three cam followers (second cam followers) N11 project radially inwards, respectively. As the first-lens-group support ring 2 and the cam ring 11 approach each other in the optical axis direction, the support members (overlapping portions) 2*d* overlap the outer peripheries of the thin-walled portions lid (see FIGS. 1 and 8) and the cam followers N11 enter the first-lens-group accommodating cam grooves M11, respectively. The total wall thickness of each thin-walled portion lid and the associated support member 2*d* that overlap each other is substantially identical to the wall thickness of the main body of the cam ring 11, on which the first-lens-group control cam grooves M1 are formed. Similar to the first-lens-group control cam grooves M1 and the cam followers N1, the firstlens-group accommodating cam grooves M11 and the cam followers N11 are provided at substantially regular intervals in the circumferential direction about the photographing optical axis O.

Reference marks "R11", "W11" and "T11" shown in FIG. 7 designate the positions of each cam follower N11 in the associated first-lens-group accommodating cam groove M11 when the zoom lens barrel 10 is in the lens barrel accommodated state (shown FIG. 1), the wide-angle extremity in the ready-to-photograph state (shown in FIG. 2) and the telephoto extremity in the ready-to-photograph state, respectively. The positions R11, W11 and T11 will be hereinafter referred to as a retracted position R11, a wide-angle extremity position W11 and a telephoto extremity position T11, respectively. Each first-lens-group accommodating cam groove M11 is open to the front end of the cam ring 11 and does not exist in the entire zooming range from the wide-angle extremity position W11 to the telephoto extremity position T11 of each cam follower N11. Each first-lens-group accommodating cam groove M11 exists only in the range from a position behind the wide-angle extremity position W11 to the retracted position R11. Each first-lens-group accommodating cam groove M11 is wide (the widest) in width at the opening thereof that is exposed at the front end of the cam ring 11 and progressively decreases in width toward the rear in the optical axis direction. At the retracted position R11, the width of each first-lens-group accommodating cam groove M11 is set to be capable of holding the associated cam follower N11 with no play between the cam follower N11 and the first-lens-group accommodating cam groove M11. More specifically, each first-lens-group accommodating cam groove M11 consists of a differential inclined groove portion M11-1 which is inclined with respect to the rotational direction (circumferential direction) of the cam ring 11, a normal inclined groove portion M11-2 which is continuous with the differential inclined groove portion M11-1 and extends obliquely rearward, and an accommodating groove portion M11-3 which extends along the rotational direction of the cam ring 11 and includes the retracted position R11 of the associated cam follower N11. The differential inclined groove portion M11-1 is open at the front end of the cam ring 11 and formed as a groove which gradually changes in width with respect to the rearward direction from the opening of the differential inclined groove portion M11-1 at the front end of the cam ring 11. One of the side surfaces (lower side surface with respect to FIG. 7) of the differential inclined groove portion M11-1 is formed as a continuous inclined surface K1 which is substantially parallel to the track of the normal inclined groove portion M11-2, and the other side surface (upper side surface with respect to FIG. 7) of the differential inclined groove portion M11-1 is formed as a differential guide surface K2, the angle of inclination of which relative to the rotational direction of the cam ring 11 is greater than that of the continuous inclined surface K1. The distance between the continuous inclined surface K1 and the differential guide surface K2 increases toward the front, in the optical axis direction. The normal inclined groove portion M11-2 and the accommodating groove portion M11-3 have a constant width for holding the associated cam follower N11 in a steady manner (with substantially no play) between the associated cam follower N11 and the first-lens-group accommodating cam groove M11.

The section of each first-lens-group control cam groove M1 which extends from the wide-angle extremity position W1 to the retracted position R1 has a similar profile to that of each first-lens-group accommodating cam groove M11; specifically, each first-lens-group control cam groove M1 is provided with an inclined groove portion M1-1 which has a predetermined inclination relative to the rotational direction of the cam ring 11 and an accommodating groove portion M1-2 which extends along the rotational direction of the cam ring 11 and includes the retracted position R1 of the associated cam follower N1. Although the angle of inclination of the differential guide surface K2 relative to the rotational direction of the cam ring 11 is set greater than that of the continuous inclined surface K1 as described above, the inclined groove portion M1-1 of each first-lens-group control cam groove M1 is substantially identical in angle of inclination to the normal inclined groove portion M11-2 of each first-lens-group accommodating cam groove M11. Therefore, the amount of movement of the cam followers N11 in the optical axis direction per unit of rotation of the cam ring 11 that is caused by the differential guide surfaces K2 of the first-lens-group accommodating cam grooves M11 is greater than the amount of movement of the cam followers N1 in the optical axis direction per unit of rotation of the cam ring 11 that is caused by the inclined groove portions M1-1 of the first-lens-group control cam grooves M1.

Operations of the zoom lens barrel 10 that has the above described structure will be discussed hereinafter. Upon a main switch of an imaging device (e.g., a camera) in which the zoom lens barrel 10 is incorporated being turned ON in the lens barrel accommodated state shown in FIG. 1, the zoom motor 150 is driven to rotate the aforementioned zoom gear in the lens barrel advancing direction. This rotation of the zoom gear causes the third barrel 15 to move forward while rotating while being guided by the inner helicoid 22b of the housing 22 and causes the linear guide ring 14 to move forward linearly with the third barrel 15 without rotating. At this time, the cam ring 11, which rotates by rotation of the third barrel 15, moves forward in the optical axis direction by an amount of movement corresponding to the sum of the amount of the forward movement of the linear guide ring 14 and the amount of the forward movement of the cam ring 11 by a leading structure between the linear guide ring 14 and the cam ring 11 (i.e., by the engagement of the protrusion-guiding cam grooves 14c with the outer radial projections 11a).

A rotation of the cam ring 11 causes the third-lens-group support ring 8, which is positioned inside the cam ring 11 and guided linearly in the optical axis direction via the linear guide ring 14, to move in the optical axis direction with respect to the cam ring 11 in a predetermined moving manner due to the engagement of the cam followers N3 with the third-lens-group control cam grooves M3. In addition, a rotation of the cam ring 11 causes the first barrel 12, which is positioned around the cam ring 11 and guided linearly in the optical axis direction via the linear guide ring 14 and the second barrel 13, to move in the optical axis direction relative to the cam ring 11 in a predetermined moving manner due to the engagement of the cam followers N1 with the first-lens-group control cam grooves M1.

Namely, the amount of advancement of the first lens group LG1 from the lens barrel accommodated state is determined by the sum of the amount of forward movement of the cam ring 11 relative to the housing 22 and the amount of advancement of the first barrel 12 (the first-lens-group support ring 2) relative to the cam ring 11; the amount of advancement of the second lens group LG2 from the lens barrel accommodated state is determined by the sum of the amount of forward movement of the cam ring 11 relative to the housing 22 and the amount of advancement of the second-lens-group support ring 3 relative to the cam ring 11; and the amount of advancement of the third lens group LG3 from the lens barrel accommodated state is determined by the sum of the amount of forward movement of the cam ring 11 relative to the housing 22 and the amount of advancement of the third-lens-group support ring 8 (the anti-shake unit 26) relative to the cam ring 11. A zooming operation is carried out by moving the first lens group LG1, the second lens group LG2 and the third lens group LG3 along the photographing optical axis O while changing the air distance therebetween. Driving the zoom motor 150 in a barrel-advancing direction so as to advance the zoom lens barrel 10 from the lens barrel accommodated state shown in FIG. 1 firstly causes the zoom lens barrel 10 to move to the wide-angle extremity (shown in FIG. 2), and further driving the zoom motor 150 in the same direction causes the zoom lens barrel 10 to move to the telephoto extremity. Immediately after the aforementioned main switch is turned OFF, the zoom motor 150 is driven in the lens barrel retracting direction, which causes the zoom lens barrel 10 to perform a lens barrel retracting operation reverse to the above described lens barrel advancing operation, thus causing the zoom lens barrel 10 to move to the lens barrel accommodated state shown in FIG. 1.

When the imaging optical system of the zoom lens barrel 10 is in a ready-to-photograph state, within the zooming range from the wide-angle extremity to the telephoto extremity, the fourth-lens-group support frame 51 that supports the fourth lens group LG4 is moved along the photographing optical axis O to perform a focusing operation by driving the aforementioned AF motor (not shown) in accordance with object distance information obtained by a distance measuring device (not shown) provided, e.g., in the imaging device in which the zoom lens barrel 10 is incorporated.

Figure 8:
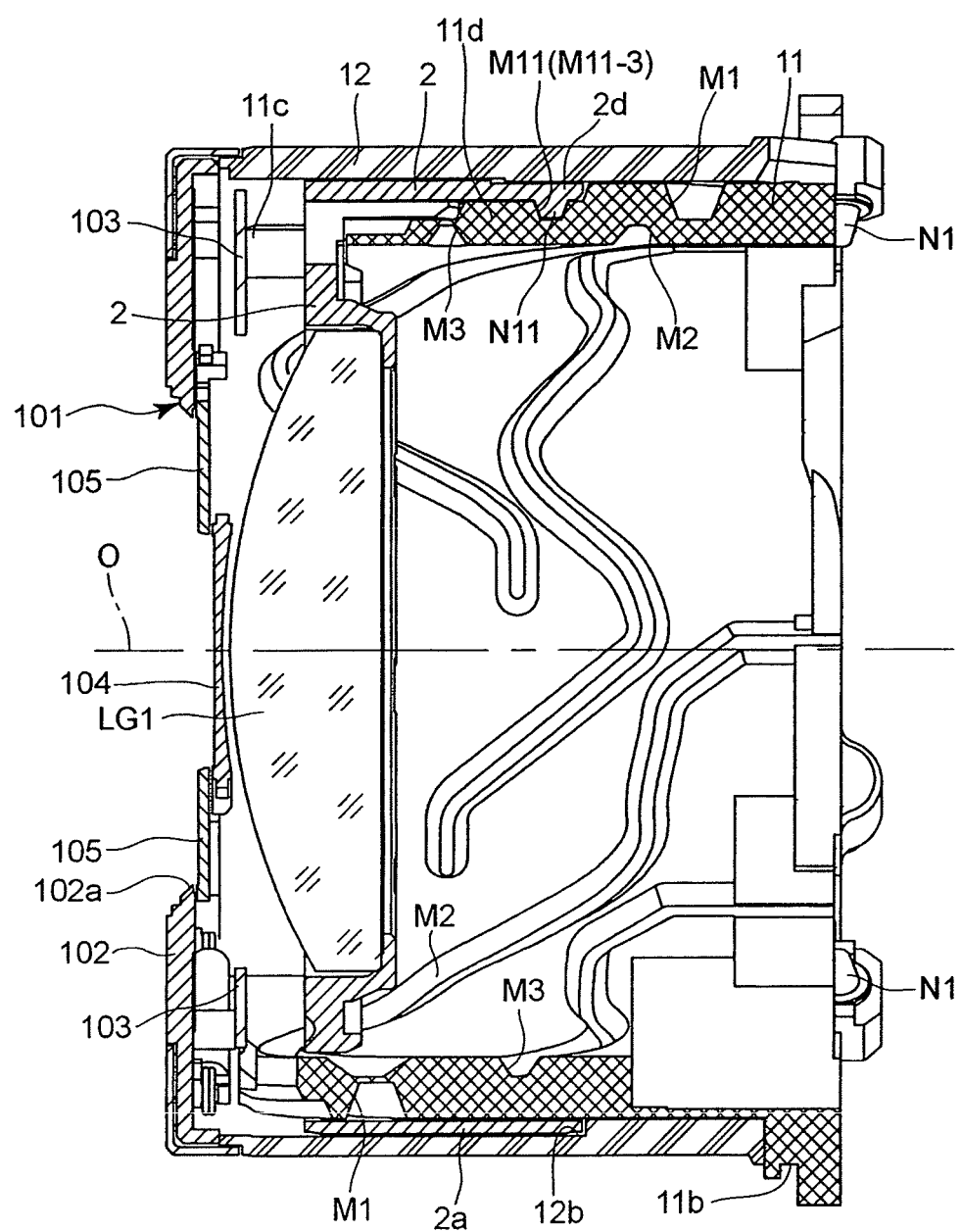
FIG. 8 is a sectional side elevational view of a portion of the zoom lens barrel, showing the positional relationship between the first-lens-group support ring, the first cylinder and the cam ring when the zoom lens barrel is in the lens barrel accommodated state.

When the zoom lens barrel 10 is in the lens barrel accommodated state, the lens barrier mechanism 101 is in a state such that the barrier drive ring 103 is pressed by the press portion 11c of the cam ring 11 against the biasing force of the pair of extension springs 107, and the pair of barrier blades 104 and the pair of barrier blades 105 are shut by the biasing force of the pair of torsion springs 106 (see FIGS. 1 and 8). When the zoom lens barrel 10 performs a zoom lens barrel advancing operation, i.e., moves from the accommodated state to a ready-to-photograph state (in the zooming range), the barrier drive ring 103 that is spaced from the cam ring 11 rotates by the spring force of the pair of extension springs 107 to open the barrier blades 104 and the barrier blades 105 (see FIGS. 2 and 9). When the zoom lens barrel 10 is in the lens barrel accommodated state, the first lens group LG1 is positioned behind the barrier blades 104 and the barrier blades 105, which are closed, so that the barrier blades 104 and the barrier blades 105 do not interfere with the first lens group LG1. On the other hand, when the zoom lens barrel 10 is in a ready-to-photograph state, the first lens group LG1 partly enters through the lens barrier opening (which corresponds to the opening 102a of the barrier support ring 102) formed by the barrier blades 104 and the barrier blades 105, which are open. Changing the position of the first lens group LG1 in the optical axis direction in the first barrel 12 in this manner makes it possible to increase the degree of freedom of optical design without increasing the length of the zoom lens barrel 10 in the optical axis direction. For instance, in the present embodiment of the zoom lens barrel 10, the second lens group LG2 is moved to a position close to the first lens group LG1 in the ready-to-photograph state shown in FIG. 2 to make the zoom lens barrel 10 have a high variable power ratio; however, this position setting of the second lens group LG2 is achieved by moving the first lens group LG1 forward in the first barrel 12 when the zoom lens barrel 10 moves to a ready-to-photograph state from the lens barrel accommodated state. In addition, by moving the first lens group LG1 forward relative to the lens barrier mechanism 101 when the zoom lens barrel 10 moves to a ready-to-photograph state from the lens barrel accommodated state, rays of light incident on the first lens group LG1 are prevented from being intercepted by the barrier support ring 102 or the barrier blades 104 and the barrier blades 105.

Figure 9:
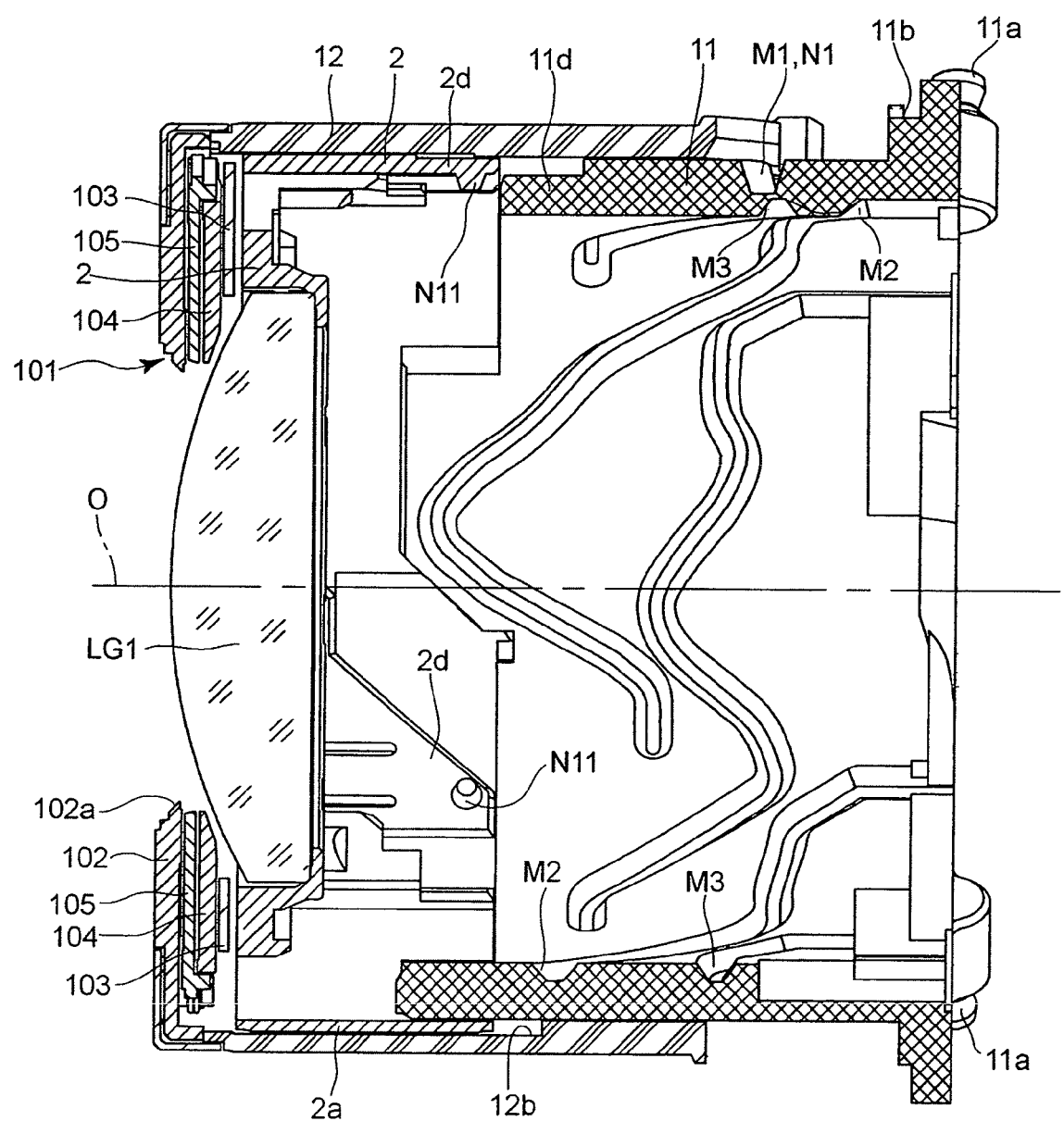
FIG. 9 is a sectional side elevational view of the portion of the zoom lens barrel shown in FIG. 8, showing the positional relationship between the first-lens-group support ring, the first cylinder and the cam ring when the zoom lens barrel is in an extended state (ready-to-photograph state).

Such a positional relationship between the first lens group LG1 and the pairs of barrier blades 104 and 105 is controlled by the relationship between the first barrel 12 and the first-lens-group support ring 2. As described above, the first-lens-group support ring 2 is positioned in the first barrel 12 and supported thereby to be movable linearly in the optical axis direction, and the first-lens-group support ring 2 that is biased forward by the biasing springs 32 is held at the limit of forward movement thereof, where the front limit projections 2b come in contact with the limit walls 12c, respectively, in a state where no external force is exerted on the first-lens-group support ring 2. When the first-lens-group support ring 2 is held at the limit of forward movement thereof, the first lens group LG1 has advanced (moved) to a position that superposes the planes in which the barrier blades 104 and the barrier blades 105 move. As shown in FIGS. 2, 7 and 9, the first-lens-group support ring 2 is held at the limit of forward movement thereof without being position-controlled by the first-lens-group accommodating cam grooves M11 because the cam followers N11 that are fixed to the first-lens-group support ring 2 are disengaged forward from the first-lens-group accommodating cam grooves M11 when the zoom lens barrel 10 is in a ready-to-photograph state. The position control for a combination of the first barrel 12 and the first-lens-group support ring 2 in the optical axis direction when the zoom lens barrel 10 is in a ready-to-photograph state is carried out by the engagement relationship between the cam followers N1 on the first barrel 12 and the first-lens-group control cam grooves M1.

When the zoom lens barrel 10 operates to retract toward the lens barrel accommodated state shown in FIGS. 1 and 8 from the ready-to-photograph state shown in FIGS. 2 and 9, the cam ring 11 rotates in the lens barrel retracting direction, and this rotation of the cam ring 11 causes each cam follower N1 to move toward the retracted position R1 from the telephoto extremity position T1 or the wide-angle extremity position W1 in the associated first-lens-group control cam groove M1 and causes the first barrel 12 to move rearward in the optical axis direction relative to the cam ring 11 by each cam follower N1 being guided by the inclined groove portion M1-1 of the associated first-lens-group control cam groove M1. The first-lens-group support ring 2 moves rearward with the first barrel 12 to thereby bring the support members 2d close to the thin-walled portions 11d of the cam ring 11, and a rearward movement of the cam follower N11 on each support member 2d beyond the wide-angle extremity position W11 causes the cam follower N11 to enter the differential inclined groove portion M11-1 of the associated first-lens-group accommodating cam groove M11 from the front end opening thereof. The front end opening of each first-lens-group accommodating cam groove M11 is wide in width, which makes it possible to allow the cam followers N11 to enter the differential inclined groove portions M11-1 of the first-lens-group accommodating cam grooves M11 smoothly from the front end openings thereof, respectively. Since the rotational direction of the cam ring 11 when the zoom lens barrel 10 moves toward the lens barrel accommodated state corresponds to the downward direction with respect to FIG. 7, the cam followers N11 which have entered the differential inclined groove portions M11-1 of the first-lens-group accommodating cam grooves M11 come in contact with the differential guide surfaces K2 of the first-lens-group accommodating cam grooves M11, and the first-lens-group support ring 2 moves rearward in the optical axis direction while being guided by the differential guide surfaces K2 of the first-lens-group accommodating cam grooves M11. As described above, the differential guide surface K2 of each first-lens-group accommodating cam groove M11 is greater in angle of inclination relative to the rotational direction of the cam ring 11 than the inclined groove portion M1-1 of each first-lens-group control cam groove M1, and the amount of movement of the cam followers N11 in the optical axis direction per unit of rotation of the cam ring 11 that is caused by the differential guide surfaces K2 of the first-lens-group accommodating cam grooves M11 is greater than the amount of movement of the cam followers N1 in the optical axis direction per unit of rotation of the cam ring 11 that is caused by the inclined groove portions M1-1 of the first-lens-group control cam grooves M1. This makes the amount of rearward movement of the first-lens-group support ring 2 greater than the amount of rearward movement of the first barrel 12, and the first-lens-group support ring 2 performs a rearward movement in the first barrel 12 which makes the front limit projections 2b spaced from the limit walls 12c against the biasing force of the biasing springs 32. This rearward movement of the first-lens-group support ring 2 in the first barrel 12 is performed at a timing earlier than the above described barrier shutting operation in which the press portion 11c of the cam ring 11 presses and rotates the barrier drive ring 103 to close the barrier blades 104 and the barrier blades 105. Therefore, the first lens group LG1 moves rearward before the barrier blades 104 and the barrier blades 105 are closed, so that no interference occurs between the first lens group LG1 and the barrier blades 104 and the barrier blades 105.

A further rotation of the cam ring 11 in the lens barrel retracting direction causes the position of each cam follower N11 of the first-lens-group support ring 2 in the associated first-lens-group accommodating cam groove M11 to move from the differential inclined groove portion M11-1 to the normal inclined groove portion M11-2. From the normal inclined groove portion M11-2 to the accommodating groove portion M11-3, the width of each first-lens-group accommodating cam groove Mil is set to precisely control the position of the associated cam follower N11 in a smooth manner, and the first-lens-group support ring 2 remains held at the retracted position thereof, at which the first lens group LG1 is retracted relative to the barrier blades 104 and the barrier blades 105 against the biasing force of the biasing springs 32. On the other hand, the rear end section of each first-lens-group control cam groove M1 that extends from the rear end of the inclined groove portion M1-1 to the accommodating groove portion M1-2 is open at the rear end of the cam ring 11, so that the precise position control for the cam follower N1 is canceled in this section. Accordingly, in a state where each cam follower N1 has reached the retracted position R1, the position control for a combination of the first barrel 12 and the first-lens-group support ring 2 in the optical axis direction is carried out mainly by the engagement relationship between the cam followers N11 (at the retracted position R11) on the first-lens-group support ring 2 side and the first-lens-group accommodating cam grooves M11 (the accommodating groove portions M11-3).

As described above, the first-lens-group support ring 2 is held in the first barrel 12 at a constant position with respect to the optical axis direction (at the limit of forward movement of the first-lens-group support ring 2) by the biasing force of the biasing springs 32 when the zoom lens barrel 10 is in the ready-to-photograph state, and the differential inclined groove portions M11-1 of the first-lens-group accommodating cam grooves M11 guide the cam followers N11 to move the first-lens-group support ring 2 rearward in the first barrel 12 only when the zoom lens barrel 10 moves from the ready-to-photograph state to the lens barrel accommodated state. This structure makes it possible to omit, from the cam ring 11, a cam groove section(s) for the positional control of the three cam followers N11 in the ready-to-photograph state, and accordingly, a significant reduction in length of the first-lens-group accommodating cam grooves M11 has been achieved compared with the case where full-length cam grooves corresponding to the entire paths of movement of the cam followers N11 from the telephoto extremity position T11 to the retracted position R11 are formed. The first-lens-group accommodating cam grooves M11 are considerably short in length, thus being capable of being arranged on the outer periphery of the cam ring 11 in a space-efficient manner without interfering with the first-lens-group control cam grooves M1. In addition, since each first-lens-group accommodating cam groove M11 exists only in a range of the path of movement of the associated cam follower N11 behind the wide-angle extremity position W11, no space for formation of a cam section in front of the wide-angle extremity position W11 needs to be provided on the cam ring 11, which makes it possible to reduce the length of the cam ring 11 in the optical axis direction.

As shown in FIGS. 1 and 8, when the zoom lens barrel 10 is in the lens barrel accommodated state, the thin-walled portions 11d of the cam ring 11, on which the first-lens-group accommodating cam grooves M11 are formed, and the support members 2d of the first-lens-group support ring 2, to which the cam followers N11 are fixed, radially overlap each other; however, the total wall thickness of each thin-walled portion lid and the associated support member 2d is substantially identical to the wall thickness of the main body of the cam ring 11. Accordingly, while the positional control of two movable members, i.e., the first-lens-group support ring 2 and the first barrel 12, is performed by the cam ring 11, the substantial total wall thickness of this portion is within the thickness of two members, i.e., the cam ring 11 and the first barrel 12 except the first-lens-group support ring 2, which prevents the support structure for the first lens group LG1 from increasing in size. This is also an effect obtained due to the structure of the first-lens-group accommodating cam grooves M11 being short in length. The first-lens-group accommodating cam grooves M11 that are short in length only require a small space on the outer periphery of the cam ring 11, and accordingly, the area on the cam ring 11 on which the first-lens-group accommodating cam grooves M11 are formed can be formed as the thin-walled portions lid that are small in wall thickness with no loss of strength in the cam ring 11 and no interference with the formation of the first-lens-group control cam grooves M1. In addition, the first-lens-group support ring 2 is radially arranged so that the support members 2d respectively overlap the outer peripheral surfaces of the thin-walled portions lid of the cam ring 11. In other words, the first-lens-group support ring 2 does not overlap the outer periphery of a thick portion (i.e., the main body of the cam ring 11, on which the first-lens-group control cam grooves M1 are formed) of the cam ring 11. This makes it possible to install the first barrel 12 immediately outside (radially outside) the cam ring 11 with no need to secure space for the thickness of the first-lens-group support ring 2 between the cam ring 11 and the first barrel 12.

In addition, when the zoom lens barrel 10 is in a ready-to-photograph state, the cam followers N11 are disengaged from the first-lens-group accommodating cam grooves M11, and the position control for the first lens group LG1 (combination of the first barrel 12 and the first-lens-group support ring 2) in the optical axis direction is carried out by the engagement relationship between the cam followers N1 and the first-lens-group control cam grooves M1. On the other hand, when the zoom lens barrel 10 is in the lens barrel accommodated state, the positional control of the first lens group LG1 (combination of the first barrel 12 and the first-lens-group support ring 2) in the optical axis direction is switched so as to be carried out by the engagement relationship between the cam followers N11 and the accommodating groove portions M11-3 of the first-lens-group accommodating cam grooves M11 due to the cam follower N1 being positioned in the accommodating groove portions M1-2 that correspond to the rear end openings of the first-lens-group control cam grooves M1, respectively. Accordingly, the zoom lens barrel 10 is configured so that one of the set of first-lens-group control cam grooves M1 and the set of the first-lens-group accommodating cam grooves M11 precisely determines the position of the first lens group LG1 in the optical axis direction while the other thereof does not interfere with the position control for the first lens group LG1 in the optical axis direction. This facilitates the mutual accuracy control between the set of first-lens-group control cam grooves M1 and the set of the first-lens-group accommodating cam grooves M11 and improves the productivity of the cam ring 11 that includes two or more types of cam grooves on the same peripheral surface thereof. Additionally, by making the accommodating groove portion M1-2 of each first-lens-group control cam groove M1 open to the rear end of the cam ring 11, a wall thickness for closing the rear ends of the first-lens-group control cam grooves M1 is unnecessary, so that the effect of reducing the length of the cam ring 11 on the rear end side thereof is also obtained.

Although the present invention has been described with reference to the above-described embodiment, the present invention is not limited solely thereto. For instance, although the above described embodiment relates to operations of the first barrel 12, which supports the lens barrier mechanism 101, and the first-lens-group support ring 2, which supports the first lens group LG1, the present invention is applicable to any lens barrel in which the position control is carried out, using a cam ring, for two movable members (an outer barrel and an internal movable member) which include mutually differentially moving ranges in the optical axis direction; in addition, the present invention does not limit the type of optical element which is supported by the outer barrel and the internal movable member. Additionally, although the above described embodiment is a zoom lens barrel to which the present invention has been applied, the present invention can also be applied to a lens barrel which does not perform a power-varying operation.

Obvious changes may be made in the specific embodiment of the present invention described herein, such modifications being within the spirit and scope of the invention claimed. It is indicated that all matter contained herein is illustrative and does not limit the scope of the present invention.

What is claimed is:
1. A lens barrel comprising:
an outer barrel which is supported to be movable linearly in an optical axis direction of an imaging optical system, said outer barrel including a first cam follower;
an internal movable member which is supported to be movable linearly in said optical axis direction in said outer barrel, said internal movable member including a second cam follower;
a biaser which biases said internal movable member forward in said optical axis direction;
a limit portion which determines a limit of forward movement of said internal movable member in said outer barrel;
a rotational cam ring;
a first cam groove which is formed on a peripheral surface of said cam ring and engaged with said first cam follower to control movement of said outer barrel in said optical axis direction in accordance with a rotation of said cam ring; and
a second cam groove which is formed on said peripheral surface of said cam ring, on which said first cam groove is formed, so as to be open at a front end of said cam ring,
wherein, when said outer barrel is positioned in front of a predetermined position in said optical axis direction, said second cam follower is disengaged forwardly from said second cam groove so that said internal movable member is positioned at a forward-movement limit in said outer barrel that is determined by said limit portion, and
wherein, when said outer barrel moves rearward beyond said predetermined position in said optical axis direction in accordance with rotation of said cam ring, said second cam groove is engaged with said second cam follower and moves said internal movable member rearward in said optical axis direction in said outer barrel against a biasing force of said biaser.

2. The lens barrel according to claim 1, wherein said second cam groove decreases in width with respect to a rearward direction in said optical axis direction.

3. The lens barrel according to claim 1, wherein said internal movable member supports a frontmost lens group of said imaging optical system,
wherein said outer barrel supports a lens barrier which closes an opening in front of said frontmost lens group when said imaging optical system is in an accommodated position, in which no pictures are taken through said imaging optical system,
wherein, when said internal movable member is positioned at said forward-movement limit thereof in said outer barrel, said lens barrier opens to form a lens barrier opening while said frontmost lens group at least partly enters through said lens barrier opening, and
wherein, when said internal movable member is moved rearward in said optical axis direction in said outer barrel via said second cam groove engaged with said second cam follower, said frontmost lens group moves rearward to be positioned behind said lens barrier opening, and thereafter, said lens barrier is closed.

4. The lens barrel according to claim 1, wherein a portion of said cam ring on which said second cam groove is formed as a thin-wall portion is smaller in radial wall thickness than a portion of said cam ring on which said first cam groove is formed,
wherein said internal movable member comprises an overlapping portion which overlaps said thin-wall portion when said internal movable member closely approaches said cam ring in said optical axis direction, and
wherein said second cam follower projects from said overlapping portion.

5. The lens barrel according to claim 1, wherein said first cam groove is open at a rear end of said cam ring, and
wherein said first cam follower is positioned at said opening of said first cam groove at said rear end of said cam ring when said second cam follower is engaged with said second cam groove so that a position of said second cam follower in said optical axis direction is controlled by said second cam groove.

6. The lens barrel according to claim 1, wherein said internal movable member comprises an annular internal movable member that is concentric with said outer barrel, wherein said limit portion comprises:
a plurality of projecting portions which are projected from an outer periphery of said annular internal movable member at different circumferential positions thereon; and
a plurality of opposed contact portions which are formed on an inner periphery of said outer barrel at different circumferential positions thereon to be respectively positioned in front of said plurality of projecting portions in said optical axis direction so as to be opposed thereto, and
wherein said biaser includes a plurality of compression springs which are installed at different circumferential positions between a front support wall and a rear support wall which are formed on said outer periphery of said annular internal movable member and said inner periphery of said outer barrel, respectively, to be opposed to each other in said optical axis direction.

7. The lens barrel according to claim 1, wherein said lens barrel is a retractable type lens barrel that advances forwardly when said lens barrel is in use and retracts rearwardly when said lens barrel is not in use.

\* \* \* \* \*